July 25, 1967　　A. J. AULERICH ET AL　　3,332,148
CUTTER

Filed Oct. 22, 1965　　2 Sheets-Sheet 1

INVENTOR
ARTHUR J. AULERICH
RAYMOND W. HEIDEN
JAMES B. WOOLEY

BY

ATTORNEY

INVENTOR
ARTHUR J. AULERICH
RAYMOND W. HEIDEN
JAMES B. WOOLEY

BY
ATTORNEY

United States Patent Office 3,332,148
Patented July 25, 1967

3,332,148
CUTTER
Arthur J. Aulerich, Whittemore, Raymond W. Heiden, Warren, and James B. Wooley, West Branch, Mich., assignors to Armstrong Cork Company, Lancaster, Pa., a corporation of Pennsylvania
Filed Oct. 22, 1965, Ser. No. 501,764
3 Claims. (Cl. 30—276)

ABSTRACT OF THE DISCLOSURE

A seam cutter cuts through overlying flexible sheet flooring while holding the overlying sheets off the floor to thereby provide excess material for a tight butt joint. The cutter has a rotary blade extending through a base plate to cut overlying layers of sheet flooring with a single cut. Wheels support the base plate above the floor for movement along the seam. A sheet material support and guide holds the overlying and overlapping flooring sheets off of the floor to provide enough extra material to accomplish a tight butt joint from the single cut, and guides the cutter in a straight line. The material support includes vertically spaced plates connected by webs to each other and to the base plate. The cutter includes a vacuum cleaning fan and bag.

The present invention relates to a cutter and more particularly to a cutter for sheet material.

Many devices for cutting sheet material may be found in the prior art. However, most of these devices pertain to cutting apparatus for cutting a single layer or thickness of material. These prior art devices are not known to have the capability of cutting multiple layers of material such as resilient floor covering, for example, in an efficient and satisfactory manner.

In the resilient floor covering field, sheets of substantial width and length are supplied in rolls or other form to the installer who cuts the supplied material to fit the area to be covered. It will be appreciated that the shape or configuration of the areas to be covered may vary quite widely, thereby resulting in the possibility of extensive, job site cutting operations. Resilient floor covering material may be supplied to the installer in standardized widths as 6', for example. If the area to be covered by such material is wider than the standard material widths and/or if the area is of great length, more than one width of material must be utilized. In such a case a seam will result between adjacent widths of material. At the present time these seams are hand cut by mechanics who are skilled in their trade, since no machine is known which will trim efficiently a single overlapping edge of sheet material or a pair of overlapping pieces of sheet material.

One of the most important considerations in seam cutting is to obtain a neat, relatively inconspicuous joint between adjacent pieces of sheet material. This is especially true in the resilient floor covering field where certain materials are adhesively secured to an underlying surface, and where there may be movement of such an underlying surface with respect to the floor covering and/or slight shrinkage of the floor covering material thereby separating the adjacent edges of sheet material comprising a seam. This subsurface movement or shrinkage, in some cases, may open a seam between adjacent sheets, thereby resulting in an unattractive, foreign material catching groove. Furthermore, such open seams are subject to being caught by heels or other objects passing thereover with the resultant possibility of damage to the material itself as well as to the object caught thereon. It is apparent that such a situation could not be tolerated for a great period of time in an area subject to heavy traffic such as that found in a public building, for example. Therefore, in order to overcome the seam opening tendency of some flooring materials, installers have resorted to a technique referred to as "fullness of cut" with regard to seams. This technique involves the formation of approximately a $\frac{1}{32}$" overlap between adjacent edges of sheet material to be seamed. The adjacent edges are forced together in butt joint relation in contact with the adhesive on the area to be covered. The resilience of the flooring material will allow such an operation without undesirable bulging. Thus, it can be seen that upon subsurface movement or material shrinkage, the tendency for the seam to open as a result of the adjacent edges of sheet material separating from one another is inhibited due to the excess of material in the area of the seam. No device is known to be able to cut a pair of overlapping edges simultaneously to obtain the "fullness of cut" which is desirable in the floor covering field prior to the device of the present invention.

The device of the present invention overcomes the difficulties of the prior art in that it not only is capable of cutting single sheets of material to trim the edges thereof but also to simultaneously cut overlapping portions of adjacent sheets of floor covering material to obtain a neat, relatively inconspicuous joint therebetween.

Accordingly, it is an object of the present invention to provide an improved cutter.

Another object of the present invention is to provide a cutter for sheet materials which will simultaneously cut and trim in seam forming relationship a pair of overlapping portions of separate sheets of material.

Other objects of the present invention will be readily apparent from the detailed description thereof as set forth hereafter with reference to the drawings wherein FIGURE 1 is a plan view of a seam cutter according to the present invention;

Figure 1:
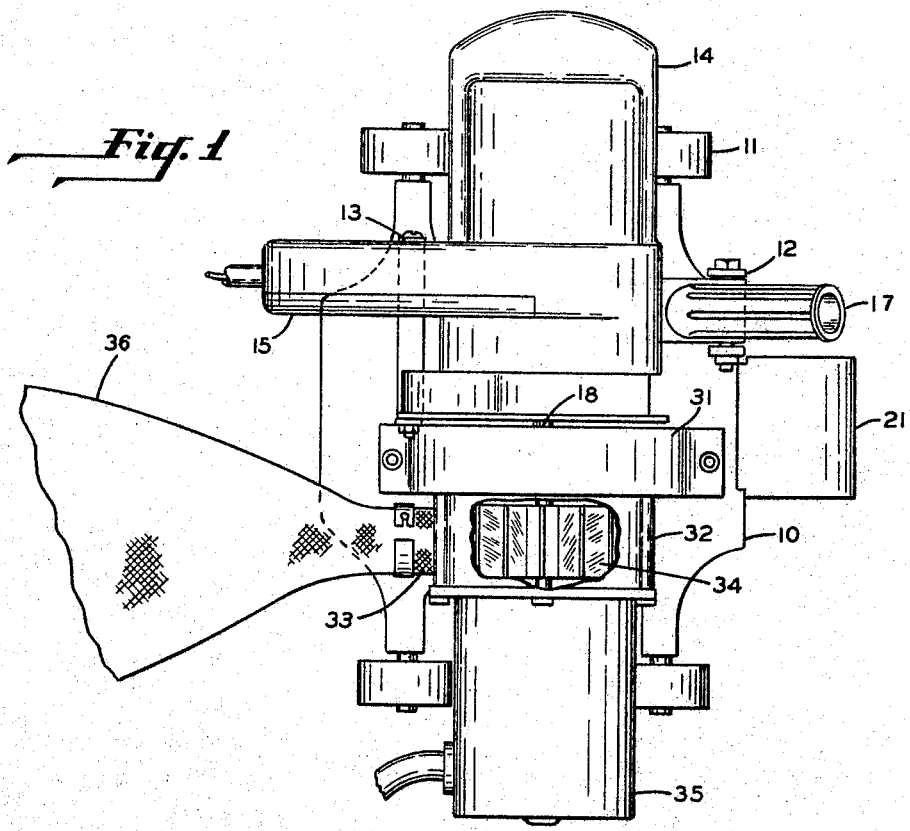
Figure 2:
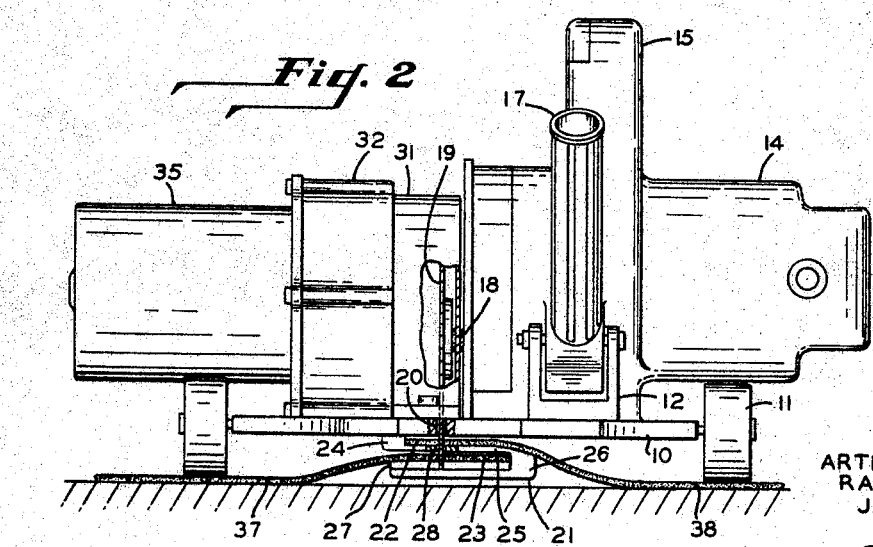
FIGURE 2 is a front view in elevation of the seam cutter shown in FIGURE 1.
Figure 3:
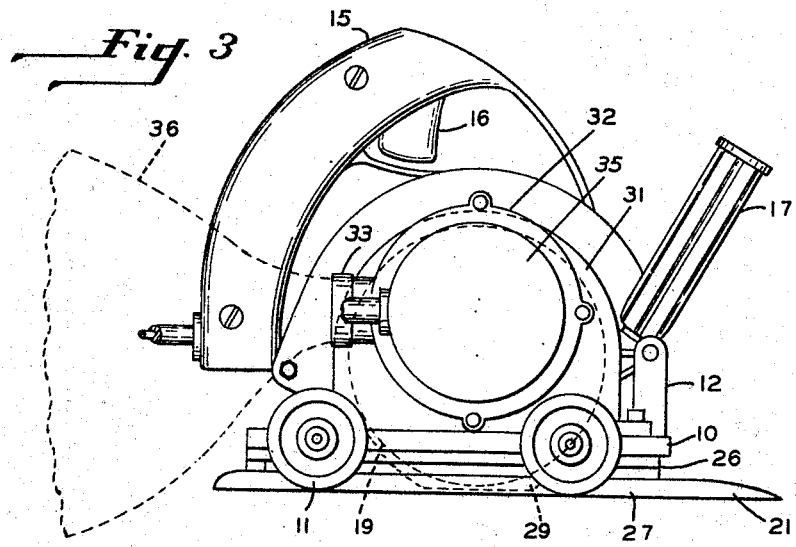
FIGURE 3 is an end view in elevation of the cutter shown in FIGURES 1 and 2.
Figure 4:
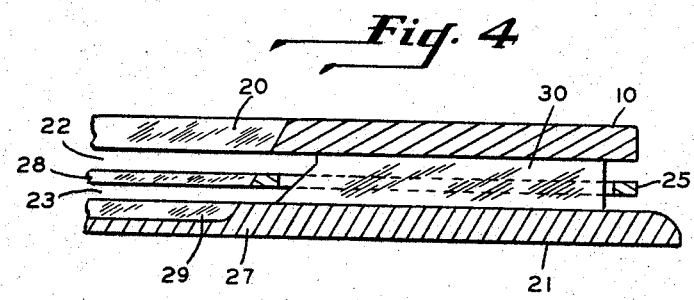
FIGURE 4 is an enlarged, partial, side view in elevation with portions broken away of the material support and guide means of the cutter shown in FIGURES 1 to 3.
Figure 5:
FIGURE 5 is an enlarged, partial end view in elevation with portions broken away of the material support and guide means of the cutter shown in FIGURES 1 to 3.

Referring now to FIGURES 1 to 3, there is shown a seam cutter which comprises a base 10 to which a plurality of wheels 11 are rotatably secured. Bracket type supports 12 and 13 extend upwardly from base 10 in spaced relationship to each other. An electric motor 14 which may be of a conventional, variable speed type is supported by means of conventional bolts extending through supports 12 and 13. Motor 14 may have a gun-type grip 15 with an actuating switch 16. Auxiliary guide handle 17 may extend upwardly from the lower portion of motor 14 on the side thereof opposite the grip 15.

Motor 14 has a drive shaft 18 extending outwardly in a direction parallel to the plane of base 10. A circular saw blade 19 may be secured to shaft 18. Base 10 is provided with a slot 20 through which the lower portion of blade 19 extends.

A material support and guide arrangement 21 extends below base 10 and is provided with overlying, oppositely opening recesses 22 and 23 formed by web 24, plate 25, web 26, and plate 27. Web 24 extends downwardly from base 10 and supports plate 25 in spaced, substantially parallel relationship with base 10. Web 26 extends downwardly from plate 25 and supports plate 27 in underlying, spaced, substantially parallel relationship with plate 25. Webs 24 and 26 are spaced from and parallel to the plane of blade 19 but are located on opposite sides thereof. Plate 25 is provided with a blade-receiving slot 28 to allow saw blade 19 to extend therethrough. Plate 27 is provided with a blade-receiving depression 29. Slots 20 and 28 along with depression 29 allow blade 19 to be freely rotated therethrough.

A vertical guide plate 30 extends between blades 25 and 27 and the lower portion of base 10. Plate 30 is located behind and in the plane of cutting blade 19.

If desired, a protective housing 31 may be provided in surrounding relationship to blade 19. Housing 31 may be secured to base 10. Housing 31 may include a guard portion surrounding the blade 19 and another portion 32 adjacent said guard portion and having a configuration of a centrifugal fan housing including a discharge 33. A fan wheel 34 may be secured to the shaft of a conventional motor 35 which may be supported by housing 31. A porous bag 36 may be connected to discharge 33.

As best seen in FIGURE 2, the cutter according to the present invention may be placed over lapped portions of adjacent sheets of flooring material 37 and 38 between which a butt seam is desired. The free end or edge of sheet 37 may be inserted into recess 23 while the free end of sheet 38 may be placed into recess 22. Once the sheets 37 and 38 are in their appropriate recesses, the saw blade 19 may be rotated by motor 14 as the cutter is advanced to and through the lapped sheets. Grip 15 and handle 17 may be utilized to move and guide the cutter. Further, either or both of the inside edges of webs 24 and 26 may be utilized as guide surfaces which cooperate with the free ends of the associated sheets to be cut such that a straight seam may be afforded. However, it is not necessary to use either of the webs as a guide, and the guiding may be entirely manual through use of the grip 15 and handle 17. The utilization of the webs as guide means will, of course, depend upon the distance therebetween as well as the degree of overlap encountered and the desired position of the seam. In any event, it can be seen that the cutter may be rolled over lapped portions to sever the excess from the adjacent sheets 37 and 38.

As blade 19 cuts through the sheets, a given amount of material is removed therefrom by the cutting action of said blade. The width of material removed from the sheets will be about the same as the thickness of the blade thereby leaving a gap between each sheet and the portion severed therefrom. The guide plate 30 fills this gap and acts as a guide to keep each sheet and its severed portion in proper alignment with either or both of the guide webs as the cutter is moved along. In this manner, a continuously straight cut and/or seam may be obtained.

Since the end portions of each of the sheets 37 and 38 are raised as they enter the recesses 22 and 23, it will be apparent that subsequent to the cut when the excess portions are removed, the adjacent, remaining ends of sheets 37 and 38 may be butted and pressed into position against the underlying support surface to form a tight joint. The cutter components may be designed so that when the cut is made with sheets 37 and 38 in a raised position, a slight excess, overlap, or overlay may be obtained in the trimmed sheets after the cutter is removed and the sheets are lowered to the underlying support surface which is usually substantially planar. This overlap is utilized in the resilient floor covering field to obtain what is known as "fullness of cut" which minimizes the opening of seams if there is any subsequent movement of the underlying surface after installation. Thus, the severed or trimmed sheets with a slight amount of overlap on the order of $1/32''$ may be pressed together into a neat, tight joint or seam against the adjacent supporting surface. As can be appreciated, the cutting device according to the present invention may be passed rapidly between lapped sheets, thereby greatly reducing the cutting time and skill required as compared with the manual method heretofore used wherein each sheet must be cut by hand and subsequently matched. The savings in cutting time and improved seams resulting from the use of the cutter according to the present invention are especially important in installations requiring seams of great length such as in stores or office buildings, for example.

As the cutter is proceeding through the sheet material, dust resulting from the cutting operation may be withdrawn from the cutting area by action of the fan wheel 34, which pulls air and dust from the cutting area upwardly through the various slots and discharges into porous bag 36 wherein the dust will be collected while the air flow created by the fan wheel 34 will pass through the porous bag 36. The air flow through the cutting area created by fan wheel 34 affords a relatively clean seam area subsequent to the cutting operation.

It has been found that good results are obtained in cutting vinyl flooring material when a carbide-tipped saw blade and a cutting speed in the area of 7,200 r.p.m. are utilized.

It is to be understood that the device of the present invention is not limited to the particular embodiment shown and described herein. Although a certain fullness of cut may be obtained with the device disclosed, such fullness of cut may be varied according to the requirements by suitably dimensioning the cutting blade and support plates. Further, the components may be formed to eliminate any fullness of cut if so desired. It is understood that one may provide the device of the present invention with a single motor having a double extended shaft wherein the saw blade might be secured to one end thereof while the fan wheel and associated housing and dust collection bag may be secured to the other end. In such a case, suitable discharge passages surrounding motor 14 would be provided to convey the dust laden air from the area of the cutting blade to the fan housing. Examples of such double extended shafts and connecting duct arrangement may be found in U.S. Patents 2,399,676 and 3,103,069. The motor or motors and housing components may be secured together in a single pivotally mounted arrangement about one of the disclosed brackets with the other utilizing a conventional quick release latch and catch means, such that the motor or motors, saw blade, and housing or housings may be raised as a single unit to allow the sheet material to be inserted in the appropriate recesses and the cutter subsequently lowered to start the cutting action. The relative size, composition, shape, location, etc., of the components may be varied. Such variation may include, but not be limited to, lengthening and widening the disclosed sheet-receiving recesses.

Various modifications will occur to one skilled in the art without departing from the spirit and scope of the invention as defined in the claims.

We claim:

1. A cutter for sheet material comprising a base, plurality of wheels rotatably secured to said base for spacing said base a predetermined distance above a supporting surface, said base having a slot therein, motor means mounted above said plate adjacent said slot, a rotary cutter blade supported by said motor means and extending through said slot to a point below said base, a first material support plate, a first web extending downwardly from said base and secured to said first plate and holding said first plate in spaced, substantially parallel relationship below said base, said first plate having a slot through which said cutter blade extends, a second material support plate, a second web extending downwardly from said first plate on the opposite side of the blade from the first web and secured to said second plate and holding said second plate in spaced, substantially parallel relationship below said second plate, said second plate having at least a portion of the slot therein accommodating the lowermost portion of said blade in surrounding, spaced relation.

2. A cutter for sheet material comprising a base, plurality of wheels rotatably secured to said base for spacing said base a predetermined distance above a supporting surface, said base having a slot therein, motor means mounted above said plate adjacent said slot, a rotary cutter blade supported by said motor means and extending through said slot to a point below said base, a first material support plate, a first web extending downwardly from said base and secured to said first plate and holding said first plate in spaced, substantially parallel relationship below said base, said first plate having a slot through which said cutter blade extends, a second material support plate, a second web extending downwardly from said first plate and secured to said second plate and holding said second plate in spaced, substantially parallel, underlying relationship with regard to said second plate, said second plate having at least a portion of the slot therein accommodating the lowermost portion of said blade in surrounding, spaced relation, said cutter blade, first web and second web lying in spaced, substantially parallel planes, with said first and second webs being located on opposite sides of said cutter blade, a vertical guide plate extending between said support plates and said base in the plane of and behind said cutter blade, and vacuum cleaning means adjacent said cutter blade.

3. A cutter for cutting overlapping edges of adjacent layers of resilient sheet material such as sheet flooring to provide a tight butt seam at the edges of adjacent layers, the cutter comprising; a generally horizontal base, a plurality of spaced wheels attached to the base near the side edges thereof and depending from said base, the wheels being spaced on each side of a cutting line a sufficient distance to support the base for movement of the cutter on and above the adjacent layers of resilient sheet material while said layers are lying flat on a supporting surface, said base having a slot therethrough, a motor mounted above said base adjacent said slot, a rotary cutter blade supported and driven by said motor and extending through said slot to a point below said base, a material support and guide arrangement supported from and extending below said base, said support and guide arrangement including a support spaced below the base for supporting overlapping portions of said adjacent layers of said resilient material beneath said slot, the support mounted from the base to provide an open space above the support and below the base in front of and laterally of the cutter blade, the support having an opening therein to accommodate the edge of the cutter blade, and a straight edge guide depending from and attached to the base, the guide being spaced from and positioned above the material support and laterally adjacent and parallel to the cutter blade for guiding the cutter along the edge of at least one of said layers so that both sheets can be simultaneously supported and cut on a straight line parallel to the edge of the sheet abutting said straight edge guide.

References Cited

UNITED STATES PATENTS

| | | | |
|---|---|---|---|
| 786,539 | 4/1905 | Wales | 145—216 |
| 1,598,070 | 8/1926 | Faase | 30—273 |
| 2,399,677 | 5/1946 | Hood et al. | 30—12 X |
| 2,799,077 | 7/1957 | Mitchell | 143—86 X |
| 2,962,062 | 11/1960 | Winkler et al. | 143—43 X |
| 2,988,134 | 6/1961 | Nissel | 156—267 |

JAMES L. JONES, Jr., *Primary Examiner.*